Oct. 4, 1955
R. O. HUTCHENS
2,719,398
LAWN TRIMMER
Original Filed June 16, 1950
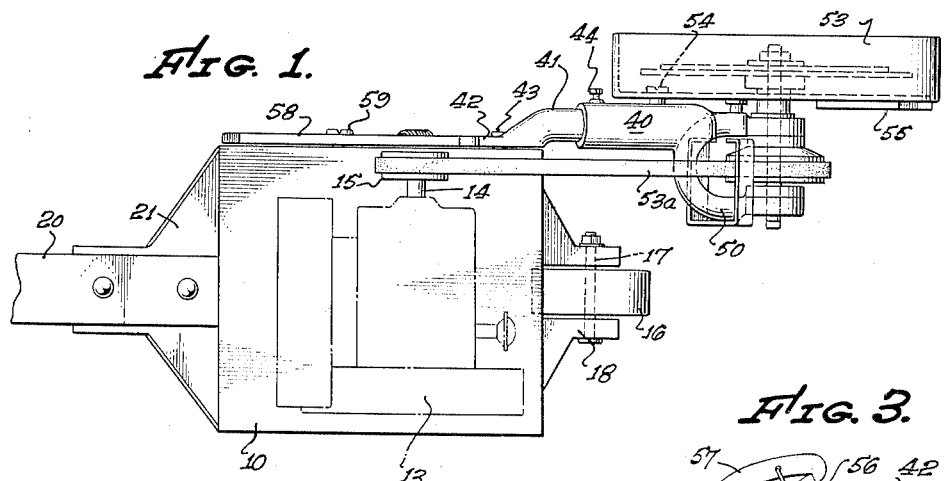
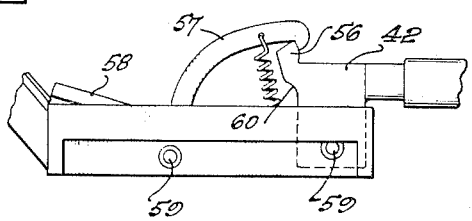
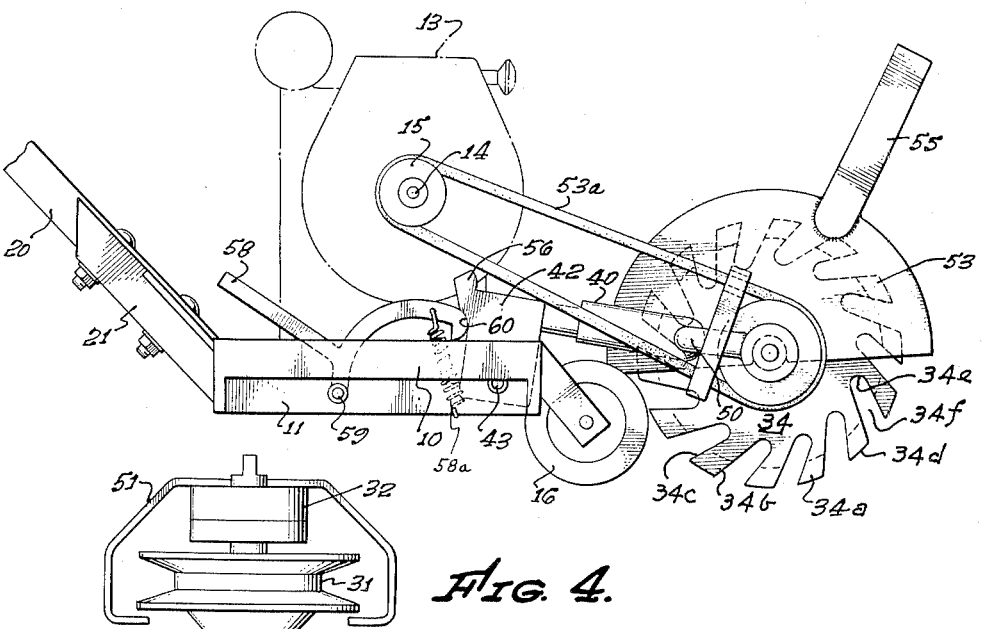
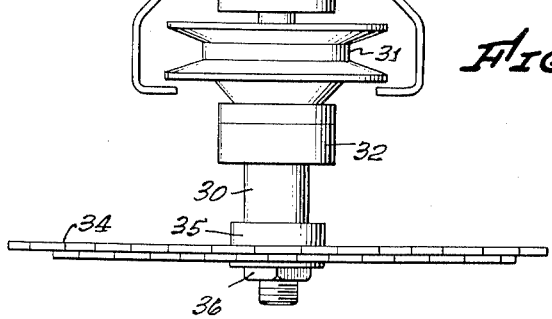
RALPH O. HUTCHENS,
INVENTOR.
BY
William C. Babcock
ATTORNEY.

United States Patent Office

2,719,398
Patented Oct. 4, 1955

2,719,398
LAWN TRIMMER

Ralph O. Hutchens, Compton, Calif.

Continuation of application Serial No. 168,506, June 16, 1950. This application March 29, 1954, Serial No. 419,196

16 Claims. (Cl. 56—25.4)

The present application is a continuation of my application Serial No. 168,506 filed June 16, 1950, now abandoned, entitled Lawn Trimmer.

This invention relates to lawn trimmers, and is particularly concerned with light-weight, easily manipulated power trimmers for lawn edges, borders, walks and the like, of homes and small estates where the operator may frequently be the owner.

In recent years domestic power lawn and garden equipment has become increasingly popular. As post-war building programs have increasingly met the national demand for small homes and estates, an increasing number of owners have become more and more interested in the care and development of their grounds. Power equipment is not only meeting their requirements for labor-saving devices, but is fulfilling an urge for equipment ownership and the pleasure of operation and control of mechanical power mechanisms.

Among the many essentials of lawn and garden care, the trimming of lawn edges as along sidewalks, flower bed borders, and adjacent buildings is one of the most important. Numerous devices applicable as attachments to power mowers have been designed and marketed to provide mechanical means for performing this task. However, since the power mower is itself a heavy and cumbersome device requiring laterally spaced ground-supporting wheels and not inexpensive in operation, such attachments have not provided an ideal solution to the trimming problem. The strength and energy required in manipulating the mower, the time and tools required for attachment and detachment, the cost of operation, and the difficulty of adjustment to meet varying conditions, have all militated against general acceptance of such attachments.

It is therefore among the general and primary objects of the present invention to provide a simple, inexpensive, light, and readily maneuverable power device primarily intended for lawn and border trimming operations only.

It is also an object of the present invention to provide a universally applicable power trimmer which may be freely and easily adjusted without special tools or skill to meet the requirements of a wide variety of trimming problems, with the cutter blade of the device being readily adjustable without disturbing the power applied thereto to assume angularities varying as much as 180°.

Another important object of the invention is to provide a device of the character set forth having ground support in a single vertical plane to permit controllable tilting of the device while in operation, which facilitate turning and backing and redirection thereof with a minimum of operator effort, as well as maintaining the cutting blade of the device in such position that grass is trimmed to the desired height, and without gouging or disturbing the appearance of the lawn surface bearing the weight of the device.

A further object of the invention is to provide novel and improved control means for elevating and adjusting the cutter blade with respect to the surface on which the invention is supported, and to incorporate in such means a securing structure precluding accidental displacement of the blade during this operation.

An important objective is also to provide a simple, effective and efficient cutter mounting and drive assembly by which angular adjustment of the blade may be secured with minimum effort and maximum security, and without such adjustment disturbing the driving means.

These and other objects, features and advantages of the present invention will be apparent from a consideration of the following specification when taken in conjunction with the accompanying drawings, in which:

Figure 1 is a top plan view of one embodiment of the present invention;

Figure 2 is a side elevation of the device as shown in Figure 1 with the cutter in lowered operative position, the power source with which the invention is not concerned being shown by dotted lines;

Figure 3 is a detail view illustrating the cutter-retaining means in the position assumed when the cutter is elevated; and, Figure 4 is an enlarged top plan view of the cutter assembly with the guard cover thereof removed.

In general terms that form of the present inventive concept here shown as illustrative of one practical embodiment thereof may be defined as comprising a base or platform for the support of a suitable power source or prime mover. Since the invention is not concerned with such prime mover itself, depiction thereof is only schematic and by dotted lines a small, frictional horsepower internal combustion or electric motor is contemplated having a drive such as the V-belt pulley indicated. In general terms the present invention comprises a base or platform that is movably supported in such a manner to permit angular adjustment thereof relative to the surface on which it rests. A prime mover of any desired type is mounted on the upper surface of the base, and by means of an endless belt, rotates a cutter blade positioned on the outer extremity of an elongate rigid member projecting forwardly from said base. The cutter blade is adjustably supported by said member, and as a result may be either horizontally or vertically disposed, or placed in any desired intermediate position therebetween. When in a horizontal position the cutter blade may be used for trimming operations, and the height of the wheel is controlled by angular adjustment of the base relative to the ground surface, or by pivoting the member upwardly or downwardly by manually operable adjustment means provided for this purpose, which will later be described in detail. Due to the endless belt used for power transmission between the prime mover and cutter blade, adjustment of the cutter blade is easily and quickly effected.

A simple and effective foot-operated lever means serves the dual purpose of maintaining the cutter assembly in an elevated inoperative position, or in a lowered adjusted operative position. A guard preferably encloses the cutter blade, which is of such design to provide not only protection from inadvertent contact with the blade, but permits free and unobstructed use of the blade in any one of the numerous positions to which it may be adjusted.

Referring to the drawings, the supporting base 10 is here shown as generally rectangular in form and provided with depending side flanges 11. It will be understood, of course, that the size, shape and general configuration of the base is not critical, and may be dictated by such matters as the character of the prime mover including its own base, the desired relative location of the prime mover, the desired overall dimensions of the device, and such cooperatory design features as may be incorporated. Thus it is to be understood that the rectangular form here shown and the depending flanges may be substituted by other solid of skeletal frame elements. The prime mover is depicted in outline by dotted lines and indicated by the numeral 13. As thus shown, an internal combustion power plant is suggested having a power shaft 14 upon which is mounted a driving pulley 15. Obviously, conventional mounting means for securing the prime mover to the base 10 may be employed as well as control devices including a clutch for the shaft 14 and pulley 15. However, since the invention is not concerned with such usual accessories, no detailed discussion thereof need here be resorted to.

An important feature of the invention is the support of the base, of whatever type elected by wheel means of such type that the base may be angularly adjusted relative to the surface on which said wheel means rest, to control the position of the cutter blade relative to said surface. In the present construction I have found it convenient to provide by a single ground-engaging wheel 16 mounted upon a transverse axle 17 supported between forwardly projecting arms 18 secured to the base 10. As indicated in Figure 2, the arms 18 extend downwardly from the base so that a wheel of small dimension may be mounted between the arms and wholly below the upper surface of the base. While a rigid non-rotatable mounting of the axle 17 in a horizontal plane is not required, such non-rotatable mounting is here shown as preferable as compared with a swivel or caster type of mounting. By rigidly securing the axle, the whole unit may be easily turned and angularly adjusted during travel of the device.

Guidance and manipulation of the unit is conveniently provided by a conventional single shaft mower-type handle 20 rigidly secured as by brackets 21 to the base 10. As illustrated, the handle 20 extends upwardly and rearwardly from the base 10 in substantially the vertical plane of the wheel 16. Thus, by tilting of the handle, the position of the whole structure may be varied relative to the ground surface. While the present single wheel arrangement permits turning movement when the handle is moved to one side of the longitudinal axis of the device, the tilting feature when limited to lateral adjustment could also be carried out by a plural wheel device in which a second load-supporting wheel is mounted in line with the present wheel 16. Tiltability has an important function in operation of the present invention, for although the blade may be adjusted to various angularities, a tilting of the whole unit in any desired direction may avoid the necessity for blade adjustments, and hence greatly ease manipulation of the invention.

The cutter assembly of the present device, as more clearly seen in Figure 4, comprises a cutter shaft 30 to which is secured for rotation therewith, a driven V-belt pulley 31. Support of the shaft is by means of one or more bearing members 32 here shown as two, one on either side of the pulley 31. The shaft 31 projects beyond the lower bearing as seen in Figure 4, to receive the cutter blade 34 which is engaged for rotation with the shaft by cooperation of hub 35 and a releasable securing nut 36.

The blade 34 of the present invention is annular in shape and formed with a central opening to permit it to be removably mounted on the supporting shaft. Each of the teeth 34a on the blade is defined by one edge 34b, an oppositely disposed edge 34c that tapers inwardly thereto, and an outer convex edge 34d extending between the outer extremities of edges 34b and 34c. The edge 34b of one tooth 34a, and 34c of an adjoining tooth are connected by a concave edge portion 34e, with the edges 34b, 34c and 34e defining the extent of a slot 34f existing between each pair of teeth on the blade.

The cross section of slot 34f is substantially the same as that of a tooth 34a, and it has been found that when this relationship is maintained the blade operates satisfactorily to trim grass when horizontally disposed, and to edge when angularly situated relative to the surface on which the invention rests.

Support of the shaft 30, by either one or a pair of the bearing members 32 from the base 10, is by means of a telescopically mounted bearing support sleeve 40 to which one or both of the bearings 32 are rigidly secured, and which receives therein the stub end 41 of a pivotally mounted adjustment plate 42 secured to the base 10 by means of a pivot pin 43. By this arrangement it will be seen that pivotal movement of the plate 42 on the base will produce a corresponding arcuate movement of the stub 41 and with it the sleeve 40 carrying one or both of the bearings 32. By such movement the shaft 30 may be raised or lowered with respect to the ground. The sleeve 40 is secured in longitudinal and/or rotatable adjustment relative to the stub 41 by a readily releasable set screw 44. Hence, when the axis of shaft 30 is to be adjusted, the set screw 44 may be loosened, the sleeve 40 rotated on the stub 41, and the supporting bearing 32 thus turned.

The bearings 32 of the present type of construction are unitized by a supporting yoke 50, the arms of which extend on either side of the pulley 31. As shown in Figure 4, a belt guard 51 is mounted on one of the arms of the yoke and extends outwardly therefrom to project beyond a belt 53a. The belt 53a extends from motor pulley 15 to cutter shaft pulley 31. A cutter guard 53 of generally hollow semi-circular form is also provided, which permits operation of the invention with the cutter blade horizontally or vertically disposed, or a position intermediate therebetween. The guard is rigidly secured, as indicated at 54 to the sleeve 40 and is formed with a rigid handle 55. Thus, when the sleeve is loosened, adjustment of the sleeve in the stub 41 may be accomplished by use of the guard handle 55.

For retaining the plate 42 in adjusted position with the stub 41, sleeve 42 and shaft 30 are raised to the inoperative position shown in Figure 3. The plate 42 is provided with a projection or detent 56, which when the plate is rocked with counter clockwise movement to the raised position, may be engaged by the hook 57 of a foot treadle lever 58 pivoted as at 59 to the base 10. Immediately below the detent 56 the plate 42 is formed with an inwardly curved securement surface 60. The front end of the hook 57 is formed with a curvature corresponding to the surface 60 and engageable therewith, as shown in Figure 2, when the plate is rocked to operative position of the trimmer assembly to secure the same against accidental movement from operative position. A contractible coil spring 58a is mounted between the foot treadle lever 58 adjacent the hook 57 thereof and the side flange 11 to normally urge the lever in clockwise rotation and thus in engagement with the plate 42.

From the foregoing it may be seen that in operation the present device may be readily maneuvered by simple control of the single arm handle. Tilting of the device for turning and for adjustment of the depth of cut is readily accomplished by virtue of the base being movably supported on a single wheel, and the position of said base being controlled by a handle. The blade 34 is rotated from the motor pulley 15 by belt 53a encircling pulley 31. Angular adjustment of the blade and its supporting shaft 30 is by rotation of the sleeve 40 upon the stub 41 after loosening of the set screw 44. Retention of the assembly in adjusted position is secured by a retightening of the set screw. For adjusting the tension of belt 53a and compensating in its length for angular changes in the relations of pulleys 15 and 31 longitudinal adjustment between stub and sleeve may be made.

It will, of course, be understood that the device as here presented is by way of illustration only, and that in the practice of the invention numerous changes and modifications may be made and the full use of equivalents resorted to, without departure from the spirit or scope of the invention set forth in the appended claims.

The invention claimed is:

1. A lawn trimmer and edger including a base with supporting wheel journaled thereto approximately on the middle line, an operating handle united to the base extending upwardly and rearwardly, a side plate pivotally united to the base at one side thereof and having a forwardly extending round shaft formed integral therewith, a sleeve adjustable both rotationally and longitudinally mounted upon said shaft having a fork or yoke formed integral therewith at its front end, a shaft journaled in said yoke carrying a front pulley and having one end extending laterally outside of the yoke, a circular cutter blade mounted upon said shaft, a set screw threaded into said sleeve arranged to contact the shaft and hold the sleeve thereon in rotational and longitudinal adjusted position, a prime mover mounted upon the base and having a drive shaft and drive pulley and a belt arranged to be driven by the drive pulley and passing around and arranged to drive the front pulley and the shaft journaled in the yoke with cutter blade attached thereto.

2. A lawn trimmer as described in claim 1, and a semicircular guard mounted on the yoke above and partially surrounding the cutter blade, a handle united to said guard by which the guard and yoke may be lifted, a bellcrank lever pivoted to the side of the base having its rear end flattened to form a footrest and its front end provided with a catch to engage a lug formed upon the upper edge of the side plate above described when the cutter is in raised position and with a head to bear against the rear edge of the side plate when the cutter is lowered.

3. In a lawn trimmer and edger, a base with a central supporting wheel journaled thereto, an operating handle united to the base, a side plate pivotally united to the base at one side thereof and having a forwardly extending round shaft formed integral therewith, a rotationally adjustable sleeve mounted upon said shaft having a fork or yoke formed integral therewith at its front end, a shaft journaled in said yoke carrying a belt pulley, a thin circular cutter mounted upon said shaft having a plurality of spaced, forwardly inclined teeth formed thereon with forwardly extending points, means attached to the sleeve arranged to contact the shaft and hold the sleeve in adjusted, rotational position whereby the cutter may be held at any desired angle between the vertical and horizontal.

4. A lawn trimmer as described in claim 1, a semicircular guard mounted on the fork above and partially surrounding the cutter blade, a handle united to said guard by which the guard and yoke may be lifted, a bellcrank lever pivoted to the side of the base having its rear end flattened to form a footrest and its front end provided with a catch arranged to engage a lug formed upon the upper edge of the side plate above described to hold the cutter in raised position, and resilient means united to the base and bell-crank lever to prevent accidental displacement thereof.

5. A lawn trimmer as described in claim 1, a semicircular guard mounted on the fork above and partially surrounding the cutter blade, a handle united to said guard by which the guard and yoke may be lifted, a bell-crank lever pivoted to the side of the base having its rear end flattened to form a footrest and its front end provided with a catch arranged to engage a lug formed upon the upper edge of the side plate above described to hold the cutter in raised position, and a tension spring united to the base and bell-crank lever to prevent accidental displacement thereof.

6. In a lawn trimmer and edger, a vertically disposable engine, a rigid horizontally disposable support on which said engine is mounted, wheel means that movably support said engine support and permit angular adjustment thereof relative to a surface on which said wheel means rests, a handle extending upwardly and rearwardly from said engine support that permits guidance and angular adjustment thereof relative to the ground surface, a first elongate member rigidly supported from one side of said engine support and extending forwardly therebeyond, a second elongate member pivotally mounted on the forward portion of said first member and axially rotatable relative to said first member, a rotatable cutter disposed outwardly from the forward end portion of said second member and parallel thereto, means that rotatably support said cutter from the forward end portion of said second member, and power transmission means extending between said engine and cutter for rotating same in a position between the vertical and horizontal, with the elevation of said cutter relative to the ground surface when in any one of said positions being controlled by the angular position of said engine support relative to said ground surface.

7. A lawn trimmer and edger as defined in claim 6 in which said first elongate member is a shaft of transverse annular cross section and said second member is an elongate sleeve pivotally supported on the forward end portion of said shaft.

8. A lawn trimmer and edger as defined in claim 7 in which said locking means is a threaded member rotatably mounted in a tapped bore provided in said sleeve, which member when screwed inwardly contacts said shaft and holds said sleeve in a fixed position relative thereto.

9. A lawn trimmer and edger as defined in claim 7 in which said means that rotatably support said cutter is a transversely disposed bearing mounted on the forward end portion of said sleeve that rotatably supports a second shaft on the outwardly disposed end of which said cutter is affixed.

10. A lawn trimmer and edger as defined in claim 9 in which said power transmission means is an endless belt that is connected to a driving pulley actuated by said engine and a driven pulley rigidly connected to said shaft.

11. A lawn trimmer and edger as defined in claim 10 in which said first shaft is pivotally connected to one side of said engine support, and said engine support has a detent pivotally mounted thereon that holds said first shaft in a rigid forwardly extending position when said detent is in a first position, which detent is adapted to be manually moved to a second position where said detent does not hold said first shaft in said first position and said shaft can be pivoted upwardly to a second position above said engine support.

12. A lawn trimmer and edger as defined in claim 11 in which spring means are provided that hold said detent in said first position, and a foot treadle is provided which is operatively associated with said detent, which treadle when manually actuated moves said detent to said second position.

13. A lawn trimmer and edger as defined in claim 11 in which a semi-circular guard and means for removably supporting it from said sleeve are provided, which guard extends upwardly from said shaft and outwardly over said cutter.

14. A lawn trimmer and edger as defined in claim 13 in which said guard is provided with a handle to move said first shaft from said first to said second position.

15. A lawn trimmer and edger, a vertically disposable engine, a rigid horizontally disposable support on which said engine is mounted, wheel means that movably support said engine support and permit angular adjustment thereof relative to the surface on which said wheel means rests, a handle extending upwardly and rearwardly from said engine support that permits guidance and angular adjustment thereof relative to the ground surface, an elongate member rigidly supported from one side of said engine support and extending forwardly therebeyond, a rotatable cutter disposed outwardly from the forward end portion of said member and parallel thereto, means that rotatably support said cutter from said member, and power transmission means extending between said engine and cutter for rotating same.

16. A device for use in so supporting a rotatable cutter that it can be driven in any one of a plurality of positions between the vertical and horizontal and at the desired elevation above the ground in lawn trimming and edging operations, including: a base; wheel means that movably support said base for angular adjustment thereof relative to the surface on which said wheel means rests, a handle extending upwardly and rearwardly from said base for guiding same; a prime mover mounted on said base; a driving pulley that is rotated by said prime mover in a fixed position; a shaft on which said cutter is mounted; a bearing in which said shaft is rotatably supported; a driven pulley rigidly affixed to said shaft; an elongate rigid member normally disposed to said shaft when said shaft is disposed to said bearing, which member is rigidly affixed to said bearing; a belt extending between said driving and driven pulleys; and mounting means positioned on one side of said base that adjustably support said first member for longitudinal and rotatable movement, which mounting means so supports said member that said belt is in vertical alignment with at least a portion of said driven and driving pulleys when said member is so disposed as to support said cutter in either a horizontal or vertical position.

References Cited in the file of this patent

UNITED STATES PATENTS

| | | | |
|---|---|---|---|
| D. 145,438 | Goodall | | Aug. 20, 1946 |
| 937,579 | Dague | | Oct. 19, 1909 |
| 953,876 | Warner | | Apr. 5, 1910 |
| 1,555,011 | Keith | | Sept. 29, 1925 |
| 2,192,762 | Vincze | | Mar. 5, 1940 |
| 2,453,819 | Smith | | Nov. 16, 1948 |
| 2,521,033 | Bell | | Sept. 5, 1950 |
| 2,525,944 | Ralston | | Oct. 17, 1950 |
| 2,529,797 | Cauble | | Nov. 14, 1950 |
| 2,537,727 | White | | Jan. 9, 1951 |
| 2,538,230 | Boggs | | Jan. 16, 1951 |
| 2,597,017 | McKinstry | | May 20, 1952 |
| 2,598,091 | Ahlgrim | | May 27, 1952 |
| 2,632,990 | Stricklen | | Mar. 31, 1953 |